Figure 1:
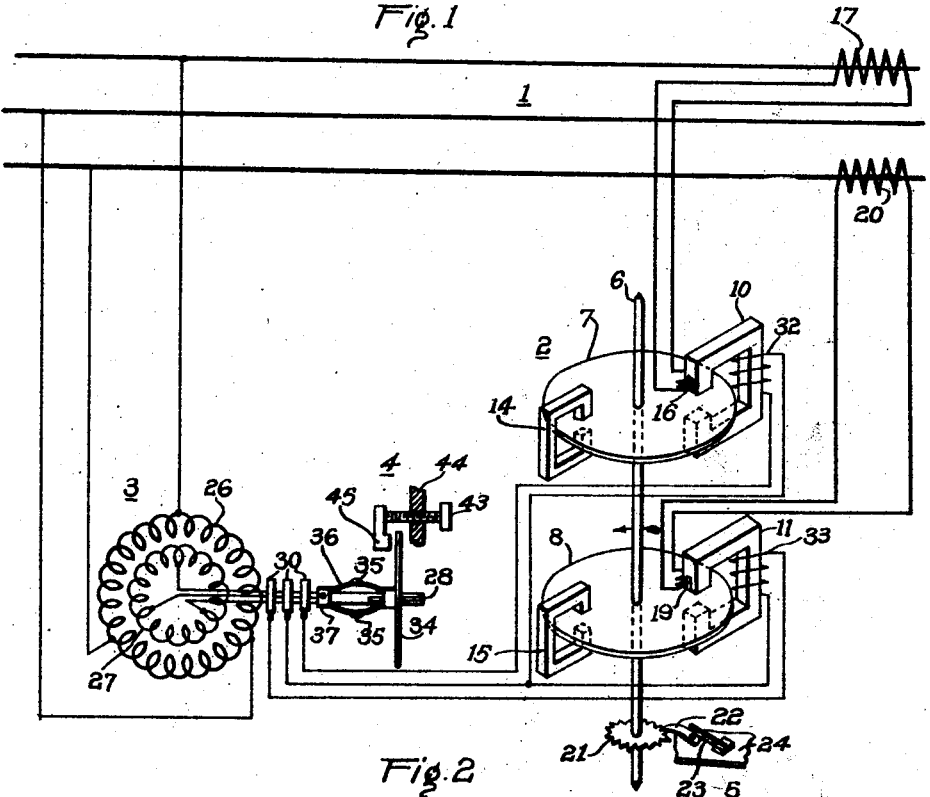

July 28, 1925.

B. E. LENEHAN

VOLT AMPERE METER

Filed May 7, 1924

WITNESSES:

INVENTOR
Bernard E. Lenehan.
BY
ATTORNEY

Patented July 28, 1925.

1,547,659

UNITED STATES PATENT OFFICE.

BERNARD E. LENEHAN, OF WILKINSBURG, PENNSYLVANIA, ASSIGNOR TO WESTINGHOUSE ELECTRIC & MANUFACTURING COMPANY, A CORPORATION OF PENNSYLVANIA.

VOLT-AMPERE METER.

Application filed May 7, 1924. Serial No. 711,575.

*To all whom it may concern:*

Be it known that I, BERNARD E. LENEHAN, a citizen of the United States, and a resident of Wilkinsburg, in the county of Allegheny and State of Pennsylvania, have invented a new and useful Improvement in Volt-Ampere Meters, of which the following is a specification.

My invention relates to electrical measuring instruments and particularly to instruments that are responsive to the volt-amperes of an alternating-current circuit.

The object of my invention is to provide an instrument, of the above indicated character, embodying elements, such as the primary and secondary windings of a phase-shifting transformer, that shall be self relatively movable and adapted to modify the current frequency in one of the coils of a watthour meter to cause the meter to operate in accordance with the volt-ampere hours of a circuit.

In copending application for a volt-ampere meter, Serial No. 622,791, filed March 5, 1923, by Joseph Slepian and assigned to the Westinghouse Elec. & Mfg. Company, is set forth an instrument in which the secondary winding of a phase-shifting transformer is rotated by a separate motor and connected to one winding of a watthour meter to cause the latter to register volt-ampere hours.

Reference to the copending application will assist in an understanding of the present invention, which omits the motor for actuating the transformer secondary winding and, thereby, simplifies the instrument and reduces the cost thereof to a marked degree.

In practicing my invention, I provide a meter, similar to an ordinary watthour meter, in which one of the coils is energized in proportion to one of the components of the apparent energy of a circuit and in which retrogressive movement of the movable element is prevented. A device, similar to a phase-shifting transformer, has a distributed primary winding that is connected in the circuit to be energized in accordance with the other component of the apparent energy and a secondary winding that is constructed and related to the primary winding to be movable relative thereto, similarly to the rotating armature of an induction motor, by the inductive relation between the windings. The rate of movement of the secondary winding is controlled by a governor device and the winding is connected to the other coil of the watthour meter to supply the latter with current that is proportional to the other component of the apparent energy, with constantly-changing phase relation.

By reason of the one-way movement of the meter element, the mean effective torque is proportional to this current and independent of its original phase.

Figure 2:
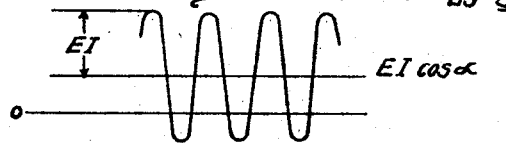
Figure 3:
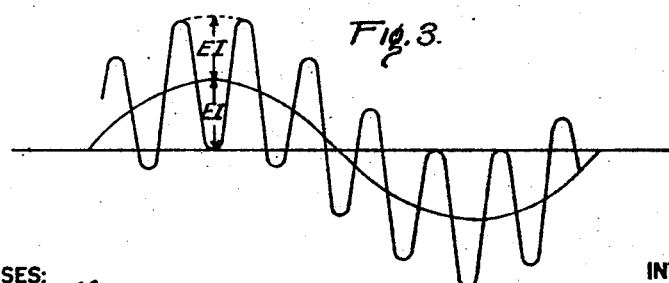

Fig. 1 of the accompanying drawings is a diagrammatic view of an instrument embodying my invention, and Figs. 2 and 3 are curves illustrating certain current and voltage relations thereof.

An instrument constructed in accordance with my invention comprises, in general, an alternating-current circuit 1, a meter 2, a transformer 3, a governor device 4 and a device 5 for restricting the movement of the meter 2 to movement in one direction.

The meter 2, similar to an ordinary watthour meter, comprises a shaft 6, disk armatures 7 and 8, core members 10 and 11, and damping magnets 14 and 15. The core member 10, associated with the disk armature 7, is provided with a winding 16 that is connected to a current transformer 17 in the circuit 1. The core member 11, associated with the disk armature 8, is provided with a winding 19 that is connected to a current transformer 20 in the circuit 1.

The device 5, which may be of any suitable construction, comprises a ratchet wheel 21 that is mounted on the shaft 6, a pawl 22 and a spring 23 that is secured to a stationary element 24 and engages the pawl 22 to bias the latter against the ratchet wheel 21.

The transformer 3 comprises a distributed primary voltage winding 26 that is connected to the circuit 1 and a rotatable secondary winding 27 that is mounted on a shaft 28. The secondary winding 27 is connected, through slip rings 30, to coils 32 and 33 on the core members 10 and 11, respectively.

The governor device 4 comprises a disk 34 that is slidably feathered to the shaft 28 and adapted to longitudinally move on the shaft in response to the rotation of the latter by reason of the relation of weight members 35 thereto. The latter are mounted on members 36 that are each secured, at one end, to the disk 34, and, at the other end, to a sleeve 37, fixed to the shaft 28.

An adjusting screw 43, mounted on a stationary member 44, carries a member 45 that is adapted to limit the inward movement of the disk 34 on the shaft 28 and, thus, to limit the speed of rotation of the winding 27.

In operation, the meter 2 operates similarly to an ordinary watthour meter, except that the shaft 6 is permitted to rotate in a forward direction only, by the device 5. The coils 32 and 16, the latter of which is energized in accordance with the current in one phase of the circuit 1, generate co-operating fluxes in the core member 10 which coact, in a usual manner, to rotate the disk 7. Similarly, the coils 33 and 19, the latter of which is energized in proportion to the current in another phase of the circuit 1, generate co-operating fluxes in the core member 11 which coact to rotate the disk 8.

The winding 27, being inductively related to the winding 26, will have a current induced therein that is proportional, in magnitude, to the voltage of the circuit 1.

The winding 27 rotates, similarly to the rotor of an ordinary induction motor, by co-operation with the winding 26, and is restrained, by the governor device 4, to rotate at a slow constant speed relative to the voltage frequency of the circuit 1. Hence, there will be a constantly-changing phase relation between the primary and secondary voltages. The rate at which the phase relation changes will depend upon the relative number of poles of the windings 26 and 27 and the ratio between the primary-voltage frequency and the number of revolutions of the winding 27. This rate of change may be adjusted to have any desired value. In other words, the power delivered by the coils 32 and 16, associated with the disk 7 and the power delivered by the coils 33 and 19, associated with the disk 8, will be, respectively, equal to the product of the voltage, the current and the average integral sum of the values taken by the cosine of the phase angle of the voltage of the winding 27. If the disks were permitted to rotate in both directions, as the phase angle of the voltage supplied by the winding 27 changed, the disks would rotate sometimes forwardly and sometimes backwardly and, with a constant load on the circuit 1, the integrated effect would be zero. This is because rotation of the coil 27 causes the current and voltage to pass through all positive and negative angles or phase relations, that is, positive for one-half revolution of the coil 27 and negative for the other half revolution thereof.

The above actions may also be described in terms of the two frequencies, one of which is supplied to the coils 32 and 33 and the other of which is supplied to the coils 16 and 19. If the winding 27 is stationary and the currents supplied to the coils 32 and 16 are of the same frequency, the torque on the disk member 7 will be a quantity of double frequency and amplitude E. I. alternating about the constant value E. I. cos α, as shown in Fig. 2, where E is the voltage on the coil 32, I is the current in the coil 16 and α is the angle between them. Similarly, the torque on the disk member 8 will be a quantity of double frequency. When the winding 27 rotates, the current supplied by the coil 32 has a frequency different from that in the coil 16. The torque is then a quantity which alternates with a frequency that is equal to the sum of the frequencies of the currents in the coils 32 and 16, about a mean value which has an amplitude E I and alternates about the zero line, with a frequency that is equal to the difference between the frequencies of the currents in the coils 32 and 16, as shown in Fig. 3. Similarly, the current supplied by the coil 33 has a frequency different from that in the coil 19.

Since the device 5 prevents rotation of the disks in the negative direction, a progressive movement of each disk is permitted that is proportional to the product of the current in the corresponding phase of the circuit 1 and a current which, so far as its effect on the disk is concerned, is in constant phase relation thereto and is variable in magnitude in proportion to the voltage of the circuit 1.

Evidently, as shown in Fig. 3, only the positive values of the torque are integrated. The result will be proportional to E I, and the influence of the phase angle has disappeared.

The rate of rotation of the winding 27 may be so adjusted that there will be little likelihood of fluctuations in the load synchronizing with it and, thus, introducing errors. With fairly constant relatively slow changing loads on the circuit 1, such as the usual industrial loads, only a very slow speed of the coil of the winding 27 will be required.

While I have shown and described a particular form of my invention, changes may be effected therein without departing from the spirit and scope thereof, as set forth in the appended claims.

I claim as my invention:

1. The combination with an alternating-current circuit, a movable member, and current and voltage-responsive means for actuating the member, of a plurality of self-relatively-movable elements for affecting the current frequency of one of said means to actuate the element in accordance with the volt-amperes of the circuit.

2. The combination with an alternating-current circuit, a movable element, and current and voltage-responsive coils for actuating the element, of a phase-shifting transformer, the windings of which are relatively movable by their own inductive motor effect, one of said windings being connected to said circuit and the other to one of said coils.

3. The combination with an alternating-current circuit, a movable element, and current and voltage-responsive coils for actuating the element, of a phase-shifting transformer, the windings of which are relatively movable by their own inductive motor effect, one of said windings being connected to said circuit and the other to one of said coils, and means for controlling the rate of relative movement of said windings.

4. The combination with an alternating-current circuit, a movable element, and current and voltage-responsive coils for actuating the element, of a phase-shifting transformer, the windings of which are relatively movable by their own inductive motor effect, one of said windings being connected to said circuit and the other to one of said coils, and means for permitting said movable element to move in one direction only.

5. The combination with an alternating-current circuit, a movable element, and current and voltage-responsive coils for actuating the element, of a phase-shifting transformer, the windings of which are relatively movable by their own inductive motor effect, one of said windings being connected to said circuit and the other to one of said coils, means for controlling the rate of relative movement of said windings, and means for permitting said movable element to move in one direction only.

6. The combination with an alternating-current circuit, a movable element, and current and voltage-responsive coils for actuating the element, of a phase-shifting transformer, the windings of which are relatively movable by their own inductive motor effect, one of said windings being connected to said circuit and the other to one of said coils, and means for causing said windings to move relatively at a constant speed.

7. The combination with an alternating-current circuit, a movable element, and current and voltage-responsive coils for actuating the element, of a phase-shifting transformer, the windings of which are relatively movable by their own inductive motor effect, one of said windings being connected to said circuit and the other to one of said coils, means for causing said windings to move relatively at a constant speed, and means for permitting said movable element to move in one direction only.

In testimony whereof, I have hereunto subscribed my name this 24th day of April, 1924.

BERNARD E. LENEHAN.